US010363899B2

(12) United States Patent
Ward et al.

(10) Patent No.: US 10,363,899 B2
(45) Date of Patent: Jul. 30, 2019

(54) SIDE AIR CURTAIN BAG

(71) Applicant: FORD GLOBAL TECHNOLOGIES, LLC, Dearborn, MI (US)

(72) Inventors: Marcus John Scott Ward, Billericay (GB); Barry Grindle, Saffron Walden (GB); Michal Jan Swiniarski, Warley Brentwood (GB); Afrin Zohura, Dagenham (GB)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/408,039

(22) Filed: Jan. 17, 2017

(65) Prior Publication Data
US 2017/0203710 A1     Jul. 20, 2017

(30) Foreign Application Priority Data

Jan. 19, 2016   (GB) .................................. 1600947.4

(51) Int. Cl.
B60R 21/232     (2011.01)
B60R 21/213     (2011.01)
(Continued)

(52) U.S. Cl.
CPC .......... B60R 21/232 (2013.01); B60R 21/213 (2013.01); B60R 21/2338 (2013.01);
(Continued)

(58) Field of Classification Search
CPC .......... B60R 2021/21512; B60R 2021/21525; B60R 2021/161; B60R 21/213
See application file for complete search history.

(56) References Cited

U.S. PATENT DOCUMENTS 6,305,707 B1 * 10/2001 Ishiyama .............. B60R 21/213
                                                                    280/728.2
6,830,262 B2 * 12/2004 Sonnenberg .......... B60R 21/232
                                                                    280/729
(Continued)

FOREIGN PATENT DOCUMENTS

DE    102004052466 A1 *  5/2006  ........... B60R 21/213
EP        0980796 A2     2/2000
(Continued)

OTHER PUBLICATIONS

Great Britain Search Report dated Jul. 13, 2016 for Great Britain Application No. 1600947.4, 6 pgs.

Primary Examiner — Nicole T Verley
(74) Attorney, Agent, or Firm — Vichit Chea; Brooks Kushman, P.C.

(57) ABSTRACT

An airbag assembly for a motor vehicle is provided. The airbag assembly comprises an airbag and a deployable ramp configured to unfurl with the airbag when the airbag is deployed. The deployable ramp is configured to transition from a stowed configuration, in which the deployable ramp is stowed with the airbag before deployment, into a ramped configuration when deployed. The deployable ramp comprises a movable element configured to move in response to the deployment of the airbag from a first position in the stowed configuration, to a second position in the ramped configuration. The movable element is arranged such that a thickness of the deployable ramp increases when the movable element is in the second position and the deployable ramp is positioned and shaped in the ramped configuration to assist the airbag in riding over a component of the vehicle as the airbag is deployed.

19 Claims, 14 Drawing Sheets

(51) Int. Cl.
  *B60R 21/231* (2011.01)
  *B60R 21/2338* (2011.01)
  *B60R 22/20* (2006.01)
  *B60R 21/16* (2006.01)

(52) U.S. Cl.
  CPC ........ *B60R 21/23138* (2013.01); *B60R 22/20* (2013.01); *B60R 2021/161* (2013.01)

(56) References Cited

U.S. PATENT DOCUMENTS

| | | | | |
|---|---|---|---|---|
| 7,309,078 | B2 * | 12/2007 | Nagata | B60R 21/213 280/728.2 |
| 7,390,016 | B2 * | 6/2008 | Noguchi | B60R 21/232 280/730.2 |
| 7,607,685 | B2 * | 10/2009 | Jang | B60R 21/213 280/730.2 |
| 8,286,991 | B2 * | 10/2012 | Shimazaki | B60R 21/213 280/728.2 |
| 8,585,080 | B2 * | 11/2013 | Trevena | B60R 21/213 280/730.2 |
| 8,714,587 | B2 * | 5/2014 | Nakamura | B60R 21/213 280/730.2 |
| 8,801,031 | B1 * | 8/2014 | Zucal | B60R 21/213 280/728.3 |
| 8,814,637 | B2 | 8/2014 | Juers et al. | |
| 9,346,417 | B2 * | 5/2016 | Sitko | B60R 13/0275 |
| 2005/0062267 | A1 | 3/2005 | Recker et al. | |
| 2006/0043703 | A1 | 3/2006 | Enriquez | |
| 2006/0061069 | A1 | 3/2006 | McKimson | |
| 2007/0090634 | A1 * | 4/2007 | Jang | B60R 21/213 280/730.2 |
| 2007/0132217 | A1 | 6/2007 | Seong | |
| 2010/0219620 | A1 * | 9/2010 | Jaramillo | B60R 21/232 280/730.2 |
| 2010/0327563 | A1 | 12/2010 | Ruedisueli et al. | |
| 2013/0161930 | A1 | 6/2013 | Moffitt et al. | |
| 2017/0066399 | A1 * | 3/2017 | Villacres Mesias | B60R 21/213 |

FOREIGN PATENT DOCUMENTS

| | | | | |
|---|---|---|---|---|
| JP | 2009149135 | A * | 7/2009 | ........ B60R 21/213 |
| JP | 2013526270 | A | 6/2013 | |
| JP | 2013256270 | A | 12/2013 | |
| KR | 100629348 | B1 | 9/2006 | |
| WO | 2012130412 | A1 | 4/2012 | |
| WO | 2012130412 | A1 | 10/2012 | |

* cited by examiner

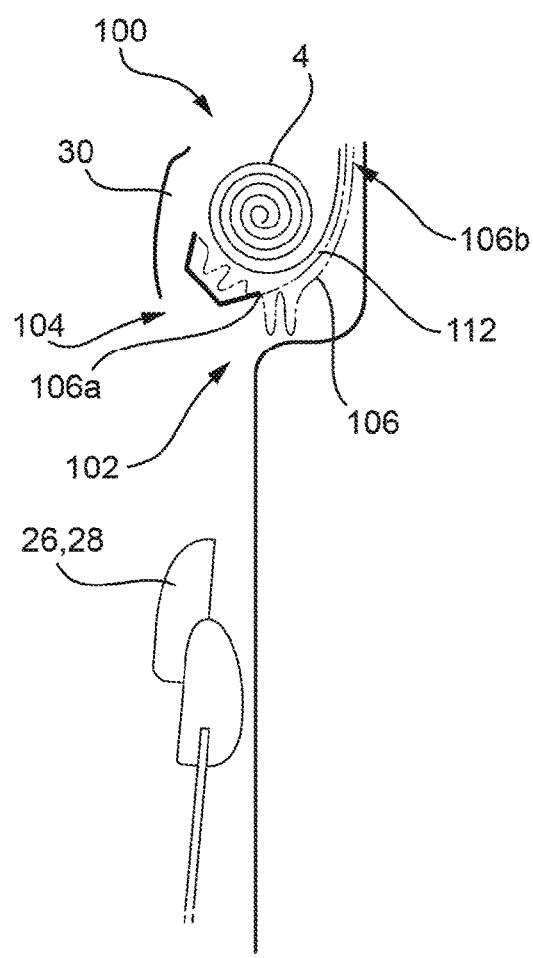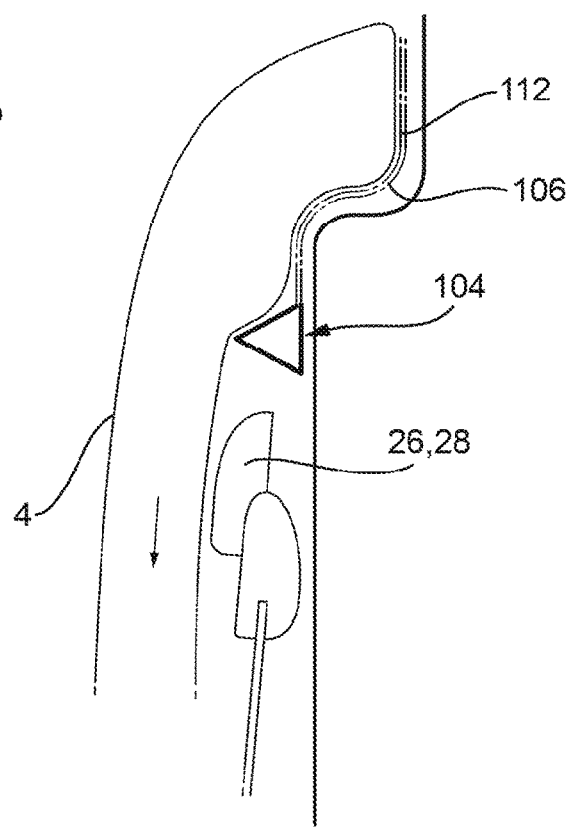

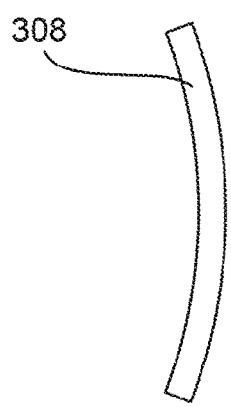
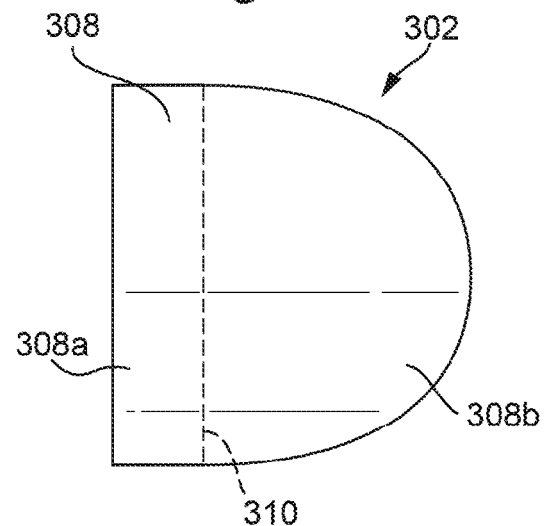
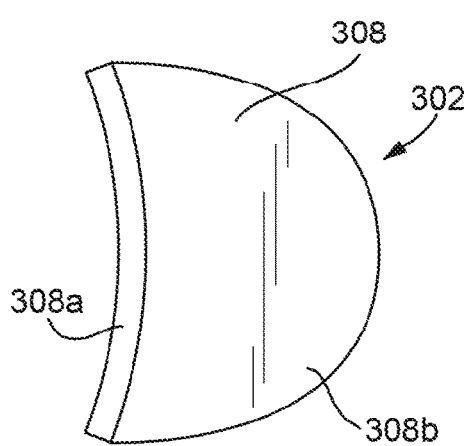
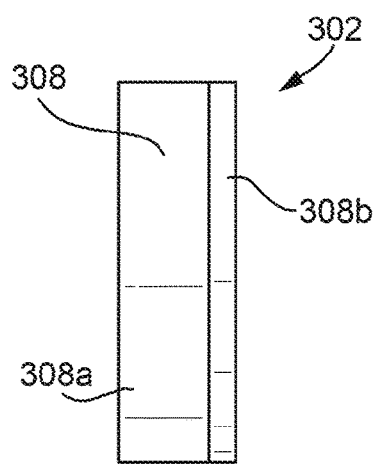

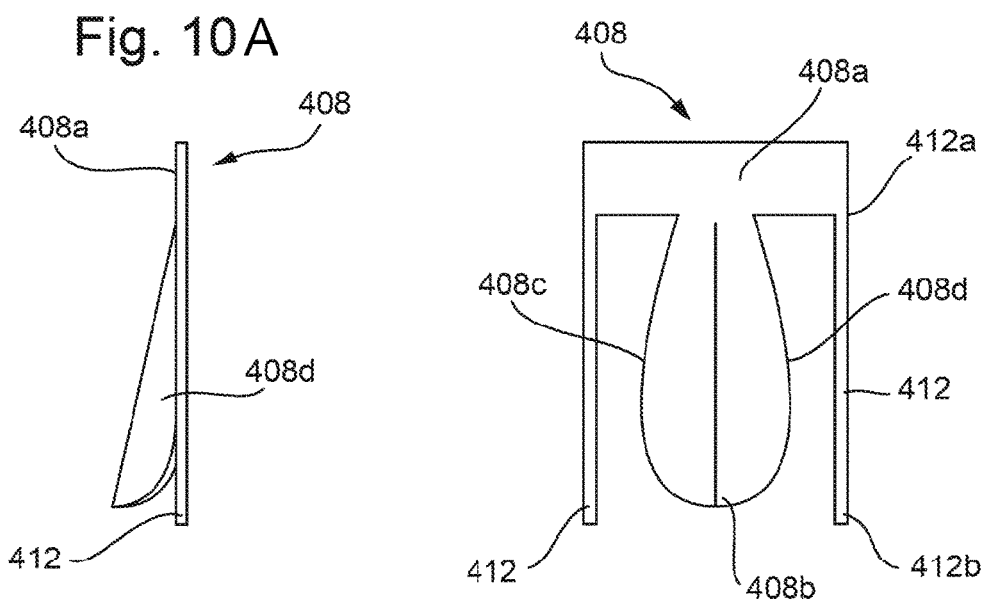
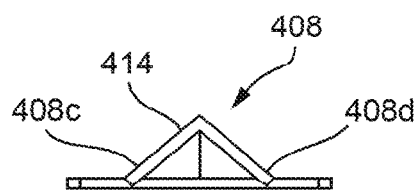
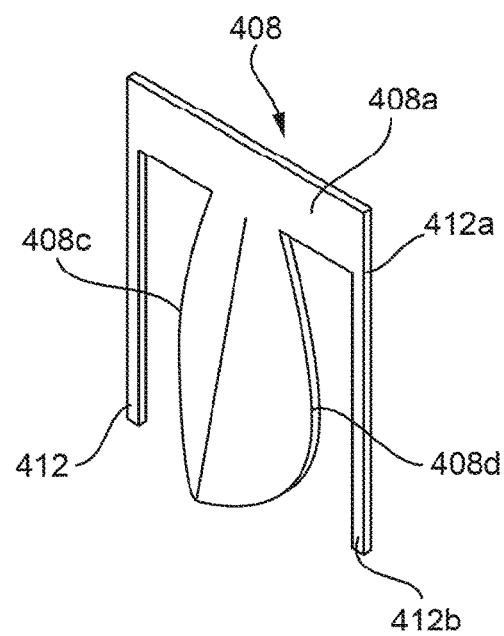

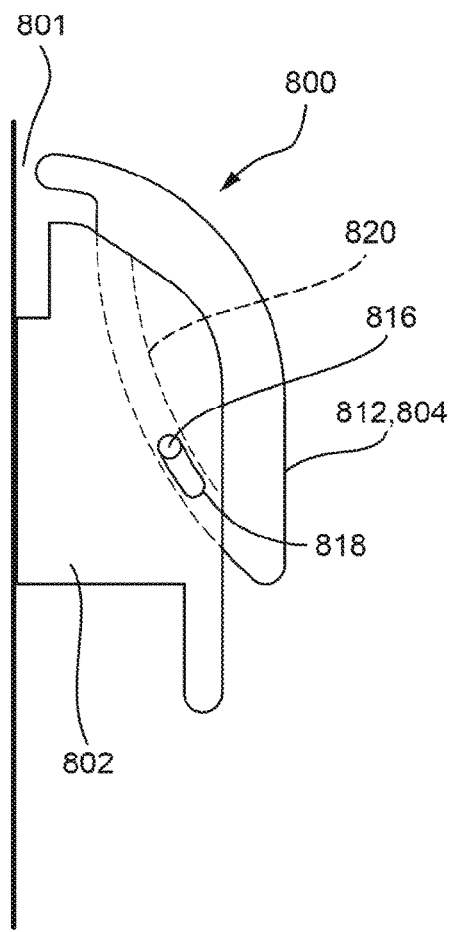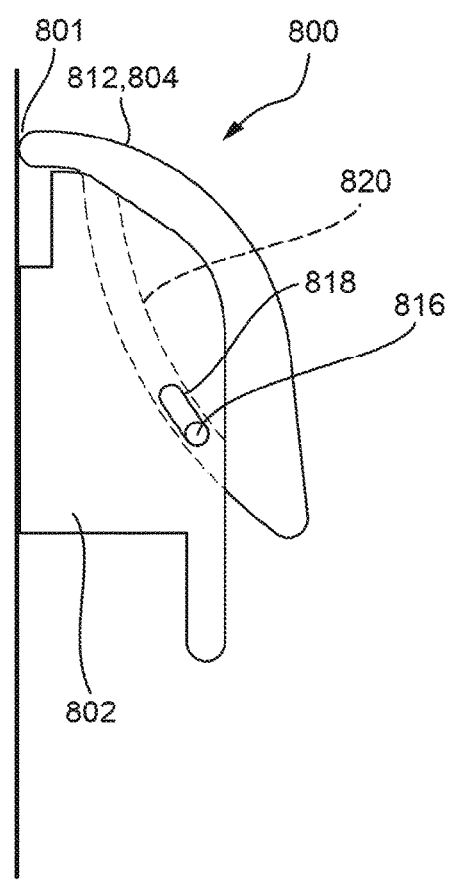

SIDE AIR CURTAIN BAG

CROSS-REFERENCE TO RELATED APPLICATIONS

This application claims foreign priority benefits under 35 U.S.C. § 119(a)-(d) to GB 1600947.4 filed Jan. 19, 2016, which is hereby incorporated by reference in its entirety.

TECHNICAL FIELD

The present disclosure relates to a Side Air Curtain (SAC) bag and a component of a vehicle, and is particularly, although not exclusively, concerned with a SAC bag configured to deploy over the component of the vehicle.

BACKGROUND

Many vehicles are fitted with airbag systems, which operate in conjunction with the vehicle seatbelts to improve occupant safety in the event of a collision. One such airbag system is the Side Air Curtain (SAC) bag, which may be configured to deploy over the side windows and side pillars of the vehicle to cushion any impacts between a vehicle occupant and these areas of the vehicle interior.

With reference to FIG. 1, a previously proposed vehicle 2 may comprise a SAC bag 4. The SAC bag 4, may extend from a first end of the SAC bag, located towards the front of the vehicle, along an A-pillar 6 and rearwards along a roof rail 8 over one or more side windows 10. The side windows may be separated by one or more pillars, such as a B-pillar 12 and a C-pillar 14. The SAC bag 4 may further extend along a rear pillar, such as a D-pillar 16, to a second end of the SAC bag 4, located towards the rear of the vehicle 2. The SAC bag 4 may be coupled to the roof rail 8 by one or more brackets 18. The SAC bag 4 may comprise tethers 20 extending from the first and second ends of the SAC bag, which are coupled to the A-pillar 6 and D-Pillar 14, respectively. Prior to deployment, the airbag 4 may be stowed within an airbag storage cavity 30, provided in the roof rail 8 and/or roof of the vehicle (not shown). An inflator 22 may be provided to inflate the airbag when a collision is detected.

With reference to FIG. 2, in the event of a collision, the previously proposed SAC bag 4 may be inflated by the inflator 22 to form one or more cushions 24, which extend over one or more areas of the windows 10 and the pillars 6, 12, 14, 16. The cushions 24 may be configured to cover areas where it is possible that an occupant of the vehicle may impact a window or pillar during a collision. The cushions 24 of the airbag may also extend over front and rear seat belt D-loop height adjusters 26, 28.

In order to cushion an impact effectively, it is desirable for the SAC bag 4 to be deployed as quickly as possible following the detection of a collision. Additionally, it may be desirable for the airbag to deploy as close to the windows 10 and pillars 6, 12, 14, 16 as possible. This may ensure that the airbag deploys between an occupant of the vehicle and the windows and pillars of the vehicle, and is positioned to cushion an impact between the two. However, when deploying close to the windows and pillars of the vehicle, deployment of the SAC bag 4 may be slowed or restricted due to the presence of components coupled to the interior of the vehicle, such as the D-loop height adjusters 26, 28.

SUMMARY

According to a first aspect of the present disclosure, there is provided an airbag assembly for a motor vehicle, the airbag assembly comprising an airbag and a deployable ramp configured to unfurl with the airbag when the airbag is deployed; wherein the deployable ramp is configured to transition from a stowed configuration, in which the deployable ramp is stowed with the airbag before deployment, into a ramped configuration when deployed; wherein the deployable ramp comprises a movable element configured to move in response to the deployment of the airbag from a first position in the stowed configuration, to a second position in the ramped configuration, the movable element being arranged such that a thickness of the deployable ramp increases when the movable element is in the second position; and wherein the deployable ramp is positioned and shaped in the ramped configuration to assist the airbag in riding over a component of the vehicle as the airbag is deployed.

The thickness of the deployable ramp may create the ramp, e.g., by forming the deployable ramp into a ramped shape. The deployable ramp may be substantially planar before deployment, e.g., in a curved plane around the stowed airbag.

The deployable ramp may comprise a tether. The tether may be coupled to the movable element such that, as the airbag is deployed, the tether may move the movable element from the first position to the second position.

The deployable ramp may comprise one or more rigid ramp members, e.g., the movable element may comprise the one or more rigid ramp members. The rigid ramp members may be coupled to a flexible portion of the deployable ramp. The flexible portion may be deployable with the airbag. The rigid ramp members may be provided within a pocket formed on the deployable ramp.

The orientations of the rigid ramp members may change when the deployable ramp transitions from the stowed configuration into the ramped configuration. The change in orientations of the rigid ramp members may increase the thickness of the deployable ramp. The change in orientation of the rigid ramp members may create the ramp, e.g., the ramped shape of the deployable ramp.

The deployable ramp may comprise two, three, four or more rigid ramp members. The orientations of the rigid ramp members may change to form a wedge when the deployable ramp is in the ramped configuration. The deployable ramp may be bistable.

The deployable ramp may further comprise one or more tethers coupled to one or more of the rigid ramp members. The tethers may become tight when the ramp is deployed. The tethers may act on the rigid ramp members to urge the orientations of the rigid ramp members to change when the ramp is deployed.

The deployable ramp may comprise one or more resilient ramp members. The resilient ramp members may comprise the movable element. For example, the movable element may be a movable portion of the resilient ramp members.

The resilient ramp members may be deformed into a substantially planar configuration before deployment of the ramp, e.g., in which the resilient ramp members may be stowed with the airbag. The resilient ramp members may return to a substantially undeformed configuration when the ramp is deployed, e.g., by virtue of the resilient ramp member's resilience, increasing the thickness of the deployable ramp.

The deployable ramp may further comprise one or more tethers. The tethers may be coupled, at a first end of the tethers, to the one or more resilient ramp members. The tethers may become tight when the ramp is deployed. The tethers may act on the resilient ramp members to urge the resilient ramp members to return to the substantially undeformed configuration when the ramp is deployed.

The first end of the tethers may be coupled to the movable element. The tethers may be further coupled, at a second end of the tethers, to a location on the deployable ramp spaced apart from the movable element.

The resilient ramp members may be profiled such that the thickness of the deployable ramp varies over the span of the resilient ramp members, e.g., in the direction of deployment.

The resilient ramp members may be provided within a pocket formed on the deployable ramp. The deployable ramp may be provided on the airbag. For example, the deployable ramp may be stitched to the airbag, e.g., to a wall of the airbag. Alternatively, the deployable ramp may be bonded to the airbag.

The airbag assembly may further comprise a ramp carrier. The deployable ramp may be provided on the ramp carrier. The ramp carrier may be formed from the same material as the airbag. The ramp carrier may be a flexible portion of the deployable ramp. The ramp carrier may be deployable with the airbag.

The airbag may comprise a side air curtain bag.

According to another aspect of the present disclosure, there is provided a component of a motor vehicle, the component being configured for placement on an interior surface of a vehicle cabin and in the path of a deployable airbag, wherein the component comprises: a body portion configured to couple the component to the vehicle; and a movable portion configured to move relative to the body portion such that movement of the movable portion guides deployment of the airbag over the component.

The movable portion may be configured such that the airbag imparts a load on to the movable portion during deployment of the airbag. The load may cause the movable portion to move relative to the body portion. The movable portion may be configured to create a ramp, allowing the airbag to ride over the component. The movable portion may at least partially form an outer surface of the component.

One of the body portion and the movable portion may comprise one or more slots, and the other of the body portion and the movable portion may comprise one or more followers configured to slide in respective slots, such that the movable portion may move relative to the body portion. The one or more slots may be curved, such that the movable portion is rotatable with respect to the body portion. The one or more slots may be curved with a center of curvature outside the component.

The movable portion may be configured to turn on a pivot to encourage an airbag of the vehicle to deploy over the component. The movable portion may comprise a roller. The roller may be configured to rotate as the airbag rides over the component, to reduce a friction force between the airbag and the component. The roller may rotate about a pivot provided on the body portion.

The movable portion may comprise a movable arm. The roller may rotate about a further pivot provided on the movable arm. The movable arm may move to alter the position of the roller relative to the body portion of the component. The movable arm may be configured to move the roller out of a recess in the body portion. A portion of the movable arm may extend beyond an outer surface of the component. The movable arm may be configured to move under action of the deployable airbag.

The pivot may be a virtual pivot, e.g., the movable element and/or the roller may not pivot about a pivot pin provided on the component. The pivot may be located remotely from the component.

The component may comprise a D-loop height adjuster for a seat belt of the vehicle.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

For a better understanding of the present invention, and to show more clearly how it may be carried into effect, reference will now be made, by way of example, to the accompanying drawings, with all view orientations being described relative to the vehicle shown in FIGS. 1 and 2; in the drawings:

BRIEF DESCRIPTION OF THE DRAWINGS

FIG. 3A is a sectional rear view through a vehicle pillar, a D-loop height adjuster and a SAC bag comprising a deployable ramp, according to a first arrangement of the present disclosure, in a stowed condition;

FIG. 3B is a sectional rear view through the vehicle pillar, the D-loop height adjuster and the SAC bag comprising the deployable ramp, according to the first arrangement of the present disclosure, in a deployed condition;

FIGS. 6A and 6B show rear and side views respectively of a resilient ramp member for a deployable ramp in a stowed configuration, according to a third arrangement of the present disclosure;

FIGS. 6C and 6D show rear and side views respectively of the resilient ramp member for the deployable ramp in a deployed configuration, according to the third arrangement of the present disclosure;

FIGS. 10A, 10B, 10C and 10D, show front, side, bottom and perspective views respectively of a resilient ramp member for the deployable ramp, according to the fourth arrangement of the present disclosure, in a pre-assembled condition;

FIG. 18A is a rear view of a component of a vehicle configured to allow a SAC bag to ride over the component during deployment of the SAC bag, according to an eighth arrangement of the present disclosure, in a neutral position; and FIG. 18B is a rear view of the component of a vehicle configured to allow the SAC bag to ride over the component during deployment of the SAC bag, according to the eighth arrangement of the present disclosure, in a deployed position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In order to reduce the time taken for a side air curtain bag to be deployed, the airbag may be provided with a deployable ramp, which increases in thickness as the airbag is deployed and encourages the airbag to ride over a component of the vehicle, which may otherwise slow the deployment of the airbag.

Figure 1:
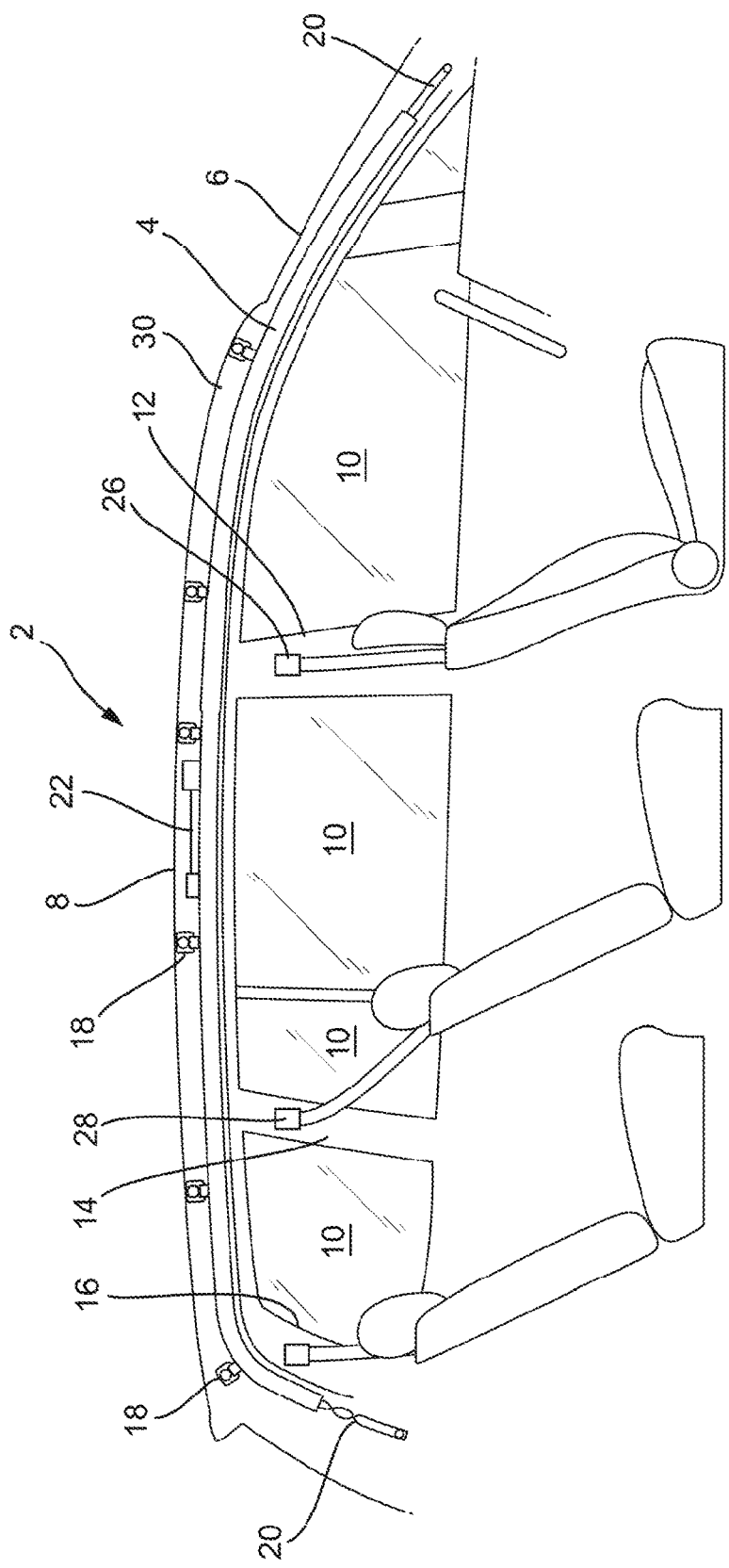
FIG. 1 is an internal side view of a previously proposed vehicle comprising a SAC bag in a stowed condition.
Figure 2:
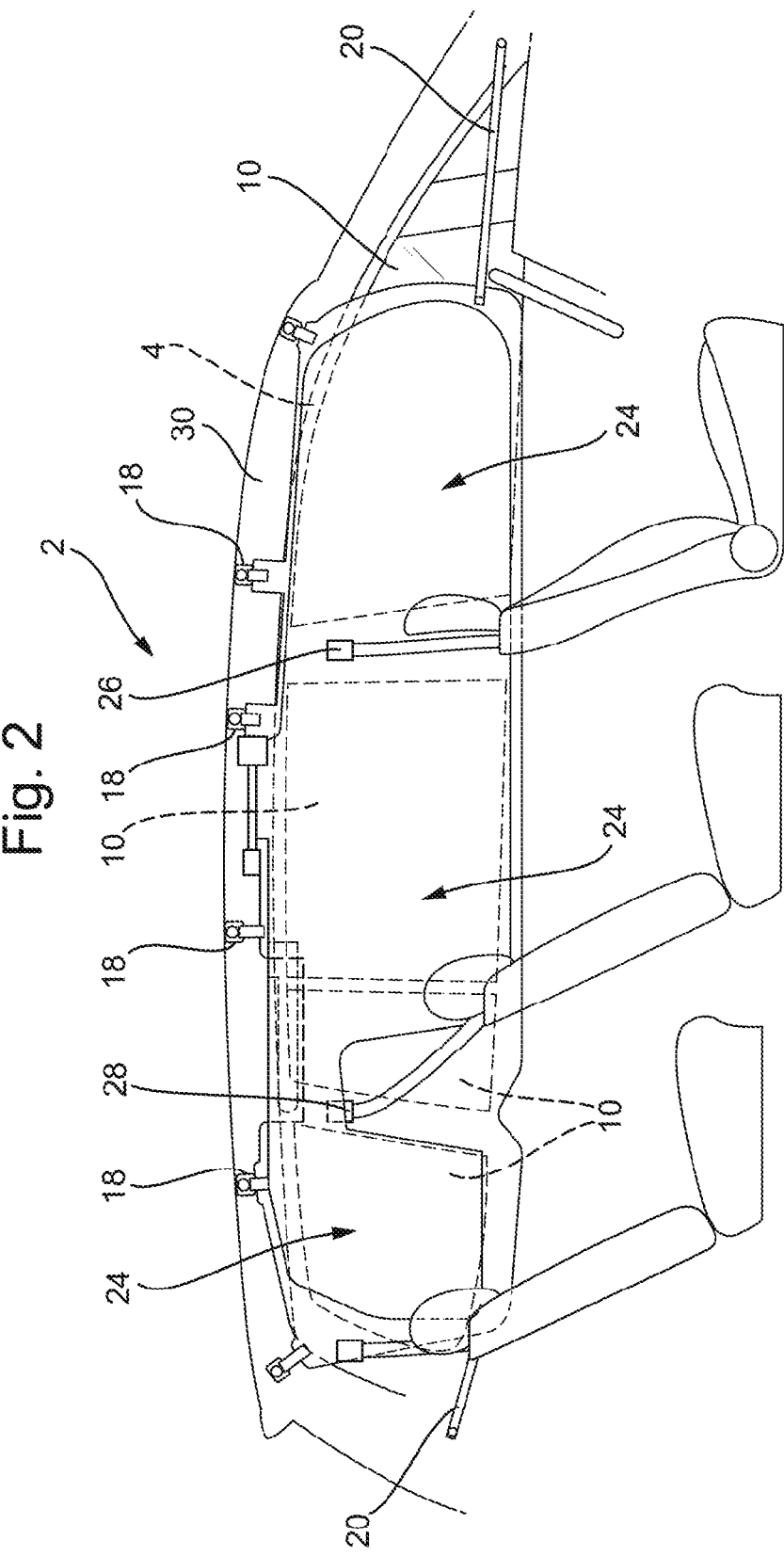
FIG. 2 is an internal side view of a previously proposed vehicle comprising a SAC bag in a deployed condition.

With reference to FIG. 3A, an airbag assembly 100 according to a first arrangement of the present disclosure may comprise a Side Air Curtain (SAC) bag 4, described above with reference to FIGS. 1 and 2, and a deployable ramp 102. As shown in FIG. 3A, prior to deployment, the SAC bag 4 may be rolled or folded into a stowed configuration. In the stowed configuration, the SAC bag 4 may be received within the airbag storage cavity 30, which may be covered by an interior trim panel (not shown). The deployable ramp 102 may be stored together with the airbag. For example, the deployable ramp 102 may be folded and/or rolled with the SAC bag 4, or rolled around part of the airbag as depicted in FIG. 3A.

The deployable ramp 102 may comprise a ramp portion 104 and a ramp carrier 106. The ramp portion 104 may be coupled to the ramp carrier 106 at a first end 106a of the ramp carrier. A second end 106b of the ramp carrier may be coupled to the vehicle 2. For example, the second end 106b of the ramp carrier may be coupled to the side rail 8 and/or a wall of the airbag storage cavity 30. Additionally or alternatively the second end 106b of the ramp carrier may be coupled to the SAC bag 4. The ramp carrier 106 may be formed from the same material as the walls of the SAC bag 4. The ramp carrier may be more flexible than the ramp portion 104. The length of the ramp carrier 106 and/or the position at which the second end 106b of the ramp carrier is coupled to the vehicle 2, may be configured such that when the airbag is deployed, the ramp portion 104 is provided in close proximity to, e.g., just above, a component of the vehicle, such as the D-loop height adjuster 26, 28, which the SAC bag 4 is required to pass over. In the case of the component being adjustable, the ramp portion 104 may be provided just above the maximum height of the component.

As shown in FIG. 3A, when the deployable ramp is in the stowed condition, the ramp portion may be substantially planar, e.g., in a curved plane within and/or around a portion of the SAC bag 4. As shown in FIG. 3B, when the deployable ramp 102 is deployed, the ramp portion 104 may transition into a ramped configuration in which the thickness of the ramp portion is increased. The thickness of the ramp portion 104 may be measured in a direction substantially perpendicular to the direction in which the airbag deploys. The shape of the ramp portion may also change when transitioning into the ramped configuration. The shape and/or thickness of the ramp portion 108, when the deployable ramp is in the ramped configuration, may be configured to encourage the SAC bag 4 to ride over the component of the vehicle, such as the seat belt D-loop height adjuster 26, 28, during deployment of the airbag.

Figure 4A:
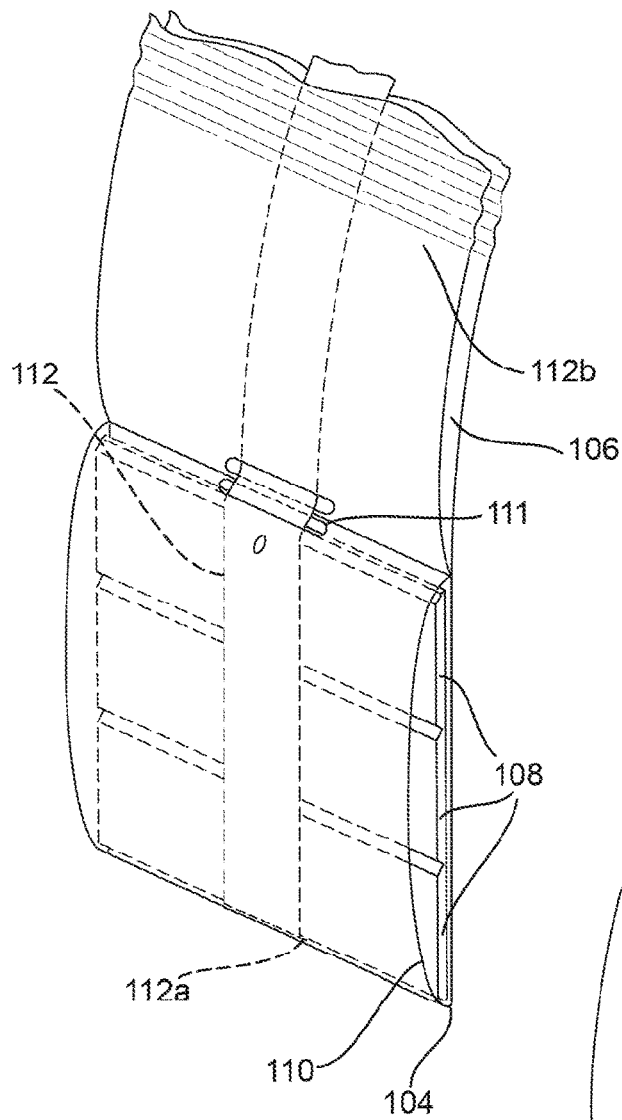
FIG. 4A is a perspective view of the SAC bag comprising the deployable ramp, according to the first arrangement of the present disclosure, in a partially deployed condition.
Figure 4B:
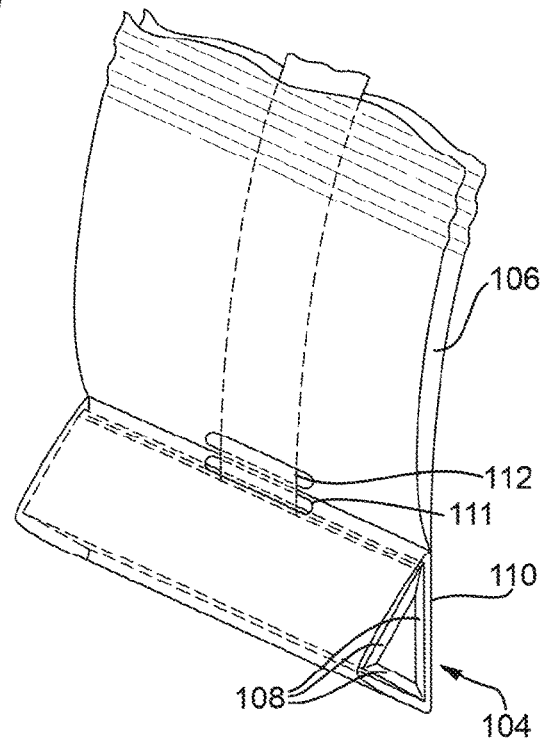
FIG. 4B is a perspective view of the SAC bag comprising the deployable ramp, according to the first arrangement of the present disclosure, in a deployed condition.

With reference to FIGS. 4A and 4B, in order for the ramp portion to change thickness during deployment of the airbag, the ramp portion may comprise one or more ramp members 108.

The ramp members 108 may be rigid, e.g., they may be rigid ramp members. Each of the ramp members 108 may be movably coupled, e.g., pivotally coupled, to the others of the ramp members 108, to allow the orientations of adjacent ramp members 108 to change relative to each other as the deployable ramp 102 is deployed. For example, as depicted in FIGS. 4A and 4B, each ramp member 108 may be pivotally coupled to one or more of the other ramp members along an edge of the ramp member.

The ramp members 108 may be coupled directly to the ramp carrier 106 using any suitable method. For example, the ramp members 108 may be stitched or bonded to the ramp carrier 106. Alternatively, as depicted in FIGS. 4A and 4B, the ramp members 108 may be provided in a pocket 110 of the ramp carrier 106. The pocket 110 may be formed by folding back a portion of the ramp carrier, located towards the first end of the ramp carrier, and securing the folded back portion at a position between the first and second ends of the ramp carrier 106. The pocket 110 may be secured, for example, by stitching or bonding the folded back portion of the ramp carrier, or by any other suitable method. Alternatively, the pocket 110 may be a separate component, which is coupled to the ramp carrier 106 at or near the first end 106a of the ramp carrier 106. The ramp members 108 may be coupled to the pocket 110 using any suitable method, for example the ramp members 108 may be stitched or bonded to the pocket 110, e.g., inside the pocket. The pocket may be closed on all sides in order to retain the ramp members within the pocket. In this case the ramp members 108 may not be otherwise secured to the pocket.

As shown in FIG. 4B, the ramp members 108 may be configured such that as the deployable ramp 102 is deployed, the ramp members 108 change their orientations relative to the ramp carrier 106 and/or the pocket 110 and increase the thickness of the ramp portion 104 of the deployable ramp 102. As such, the shape of the ramp portion may change due to the change in orientation of the ramp members. For example, as shown in FIG. 4B, two or more ramp members 108 may change their orientations to form a wedge shape. The change in thickness and/or shape of the ramp portion 104 may encourage the airbag 4 to ride over the component, such as the D-loop height adjuster 26, 28, when the airbag is deployed.

One or more edges of the ramp members 108 may be chamfered to prevent interference between adjacent ramp members when the relative orientations of the ramp members change. As shown in FIGS. 4A and 4B, the ramp members may have a trapezium cross section.

The deployable ramp 102 may further comprise one or more tethers 112. As shown in FIGS. 4A and 4B, a single tether 112 may be provided, which may be substantially centrally disposed along the span of the ramp member 108. However, it is also envisaged that any number of tethers may be used, e.g. distributed along the span of the ramp members. The tethers 112 may be provided within the pocket 110, alternatively, as shown in FIGS. 4A and 4B, the tether may enter the pocket 110 via an opening 111 in order to be coupled to the ramp members 108. The tethers 112 may be flat, e.g., the tether may be a ribbon. Alternatively, the tethers may be substantially circular in cross-section. Alternatively still, the tethers may be formed with any other desirable cross-section.

The tethers 112 may be coupled at and/or near a first end 112a to one or more of the ramp members 108. A second end 112b of the tethers 112 may be coupled to the vehicle 2 and/or to the SAC bag 4. The length of the tethers 112 and/or the position, at which the second end 112b is coupled to the vehicle 2 and/or the airbag 4, may be configured such that when the airbag is deployed and the deployable ramp unfurls, the tether 112 may become tight and may pull on one or more of the ramp members. The tether 112 may urge the ramp members 108 to change orientation. For example, as shown in FIGS. 4A and 4B, the tether 112 may be coupled to an edge, e.g., the bottom edge, of the bottom ramp member 108. When the tether 112 becomes tight, the tether may prevent the bottom edge of the bottom ramp member 108 from falling further under the action of gravity. However, the top edge of the bottom ramp member and the other ramp members 108 may continue to fall and in doing so the bottom ramp member, and the other ramp members, may change orientation. The tethers 112 may thereby cause the shape and/or thickness of the ramp portion 104 to transition from the planar configuration into the ramped configuration. For example, as shown in FIG. 4B the ramp members may transition into a substantially triangular arrangement of ramp members 108 when the deployable ramp 102 is deployed, which has a greater thickness than the planar configuration, shown in FIG. 4A.

In the first arrangement of the present disclosure, as depicted in FIGS. 4A and 4B, the deployable ramp 102 comprises three ramp members 108. However, it is equally envisaged that the present disclosure may apply to deployable ramps comprising any number of ramp members. For example, with reference to FIGS. 5A and 5B, in a second arrangement of the present disclosure, the deployable ramp 202 comprises the ramp carrier 206 and the ramp portion 204, which comprises one ramp member 208.

Figure 5A:
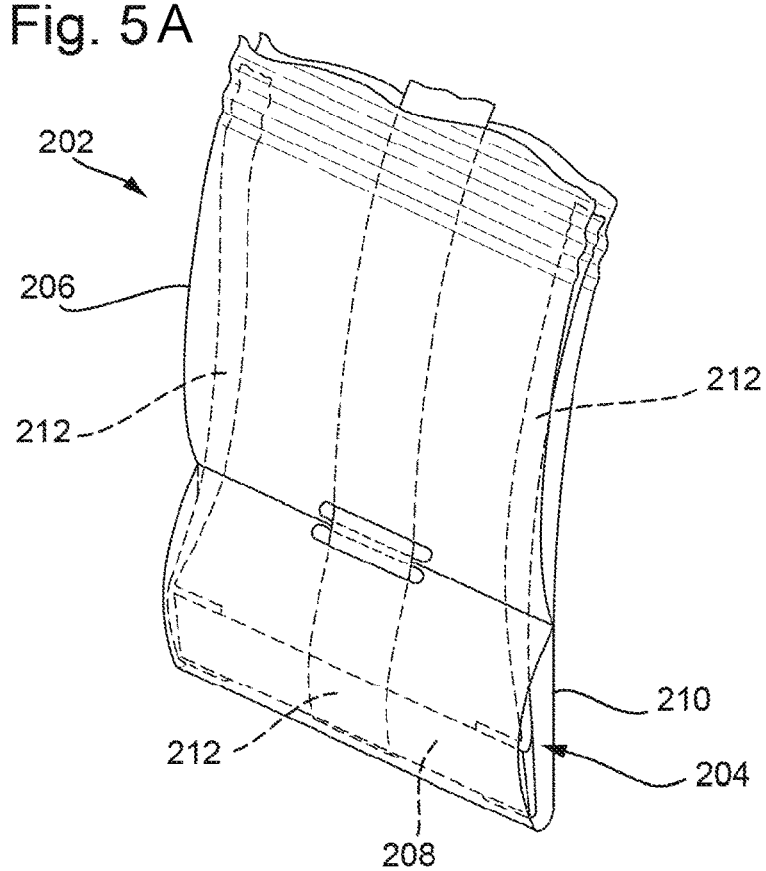
FIG. 5A is a perspective view of a SAC bag comprising a deployable ramp, according to a second arrangement of the present disclosure, in a partially deployed condition.
Figure 5B:
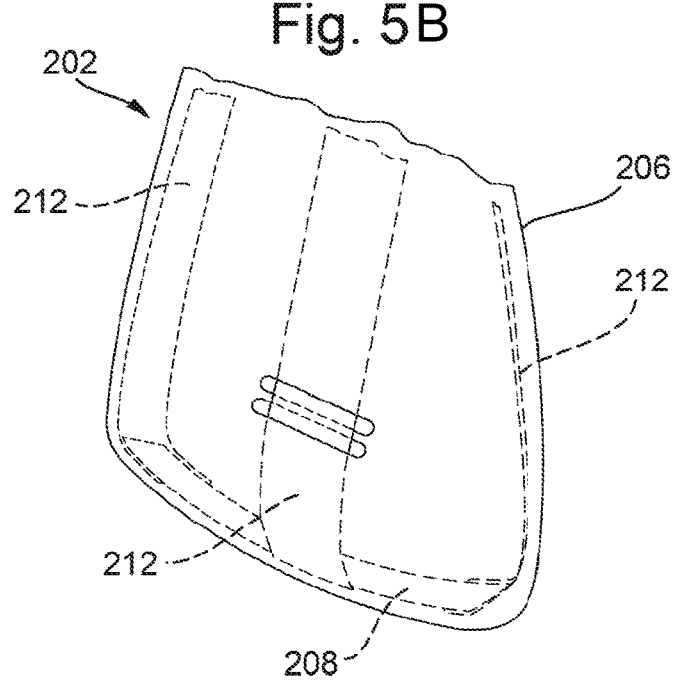
FIG. 5B is a perspective view of the SAC bag comprising the deployable ramp, according to the second arrangement of the present disclosure, in a deployed condition.
Figure 5C:
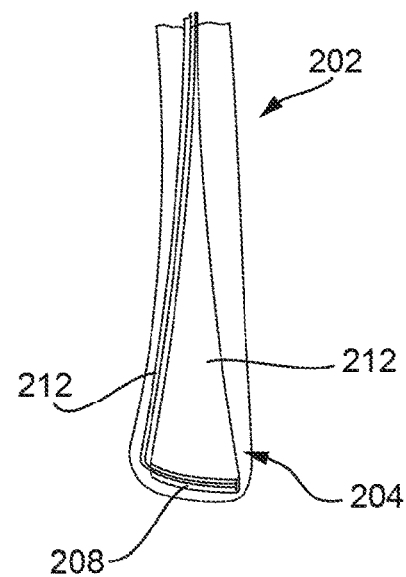
FIG. 5C is a rear sectional view of the SAC bag comprising the deployable ramp, according to the second arrangement of the present disclosure, in a deployed condition.

The operation of the deployable ramp 202 shown in FIGS. 5A and 5B is substantially the same as the operation of the deployable ramp described with reference to FIGS. 4A and 4B. For example, as shown in FIGS. 5A and 5B, the tethers 212 may be coupled to the bottom edge, the front edge and the rear edge of the ramp member 208 respectively. When the deployable ramp 202 is deployed, the tethers may become tight, and may prevent the bottom edge and the front and rear edges of the ramp member 208 from falling further. The top edge of the ramp member 208 may continue to fall and hence the orientation of the ramp member 208 may change. The tether 212 coupled to the bottom edge of the ramp member 208 may be longer that the tethers 212 coupled to the front and rear edges, and hence a portion of the ramp member towards the center of the span of the ramp member may fall further than the portions of the ramp member towards the front and rear edges of the ramp member 208. The ramp member 208 may therefore form a curved shape. The top and bottom edges of the ramp member 208 may be profiled along the span of the ramp member, e.g., between the front edge and the rear edge, such that when the ramp members forms the curved shape shown in FIGS. 5B and 5C, the thickness of the ramp portion 204 varies over the length of the deployable ramp in the direction of deployment.

The ramp members 108, 208 of the ramp portion 104, 204 may be rigid. The ramp members 108, 208 may be made from a rigid material, such as a rigid plastic. In contrast, the SAC bag 4 may be made from a fabric material. The tethers 112, 212 and the pocket 110, 210 may also be made from a fabric material. The tethers and the pocket may be made from the same material as the SAC bag 4.

Figure 7A:
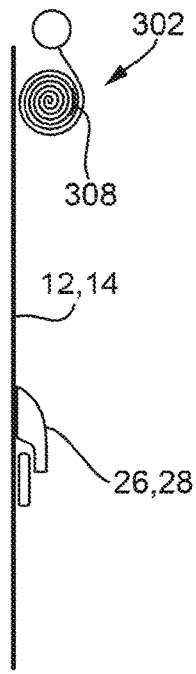
FIGS. 7A to 7F show sectional rear views of the vehicle pillar and D-loop height adjuster, and a SAC bag comprising the resilient ramp member, according to the third arrangement of the present disclosure, in progressive stages of deployment.
Figure 7B:
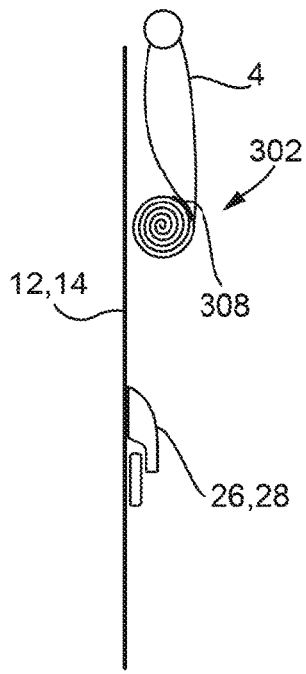

With reference to FIGS. 6A to 6D, the deployable ramp 302 may comprise a resilient ramp member 308, according to a third arrangement of the present disclosure. The resilient ramp member 308 may be deformable. As shown in FIGS. 6A and 6B, the resilient ramp member 308 may be deformed into a substantially planar, e.g., flat, configuration. When the resilient ramp member 308 is in the planar configuration, the deployable ramp 302 comprising the resilient ramp member 308 may be folded, rolled, or otherwise stowed together with the airbag 4, as shown in FIG. 7A.

As shown in FIGS. 6C and 6D, the resilient ramp member 308 may return to a substantially undeformed configuration, e.g., when the airbag is deployed. In the undeformed configuration the resilient ramp member 308 may have a different shape. Additionally or alternatively, in the undeformed configuration, the resilient ramp member 308 may have a different thickness, e.g., an increased thickness.

The resilient ramp member 208 may comprise a fixing portion 308a, a protruding portion 308b and a fold 310. The fixing portion 308a may be configured to couple to the SAC bag 4. For example, the fixing portion 308a may be stitched or bonded to the SAC bag 4 using an adhesive. Alternatively, the fixing portion 308a may be coupled to the SAC bag 4 by any other suitable method. When the resilient ramp member 308 is in the planar configuration, as shown in FIGS. 6A and 6B, the fixing portion 308a and the protruding portion 308b may lie in the same plane (which may be curved, as depicted in FIG. 6A).

When the resilient ramp member 308 is in the undeformed configuration, as shown in FIGS. 6C and 6D, the resilient ramp member 308 may be folded, e.g. bent, at the fold 310. When the resilient ramp member 308 is folded, the fixing portion 308a and the protruding portion 308b may lie in planes that are inclined with respect to one another. For example, the fixing portion 308a and the protruding portion 308b may lie in planes that are substantially perpendicular to each other.

Figure 7C:
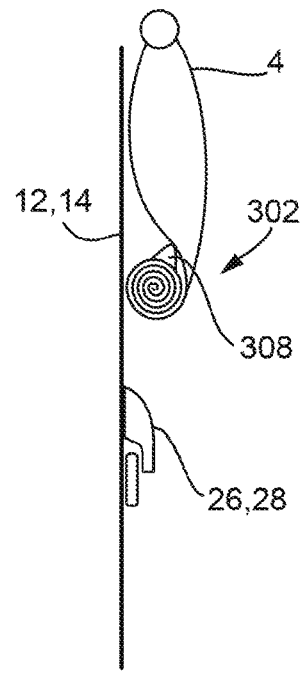
Figure 7D:
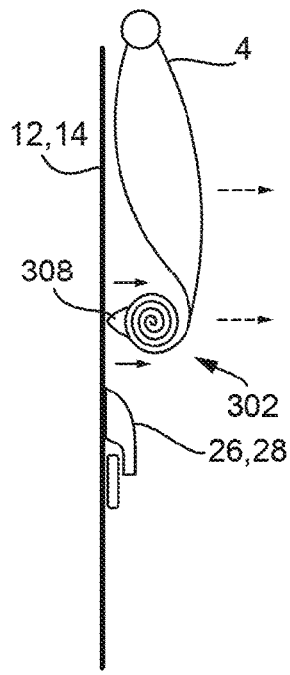
Figure 7E:
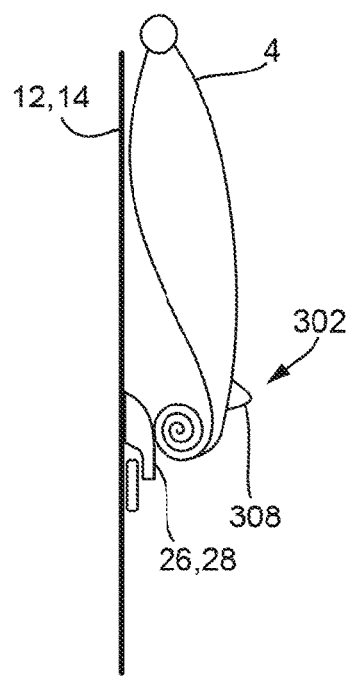
Figure 7F:
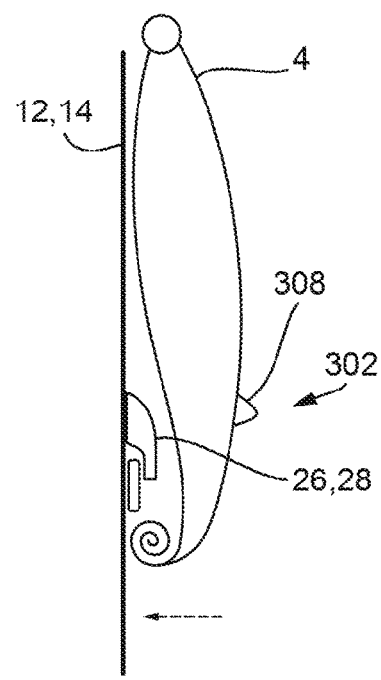

As depicted in FIG. 7E, when the resilient ramp member 308 is coupled to the SAC bag 4 and is in the undeformed configuration, the protruding portion 308b may be configured to protrude from the airbag in a direction substantially perpendicular to the direction of deployment of the airbag 4.

As depicted in FIGS. 6A to 6D, the resilient ramp member 308 may comprise a single component, which is resilient by virtue of the properties of the material out of which it is made. For example, the resilient ramp member may be made from an elastic polymer, such as rubber, or a plastic, such as nylon. In another arrangement, not shown, the resilient ramp member may comprise an assembly of components, including a resilient element configured to allow the assembly to be deformed and then to return to an undeformed shape under the action of the resilient element. In either case, the resilient ramp member 308 may be bent, squashed, folded or otherwise deformed into a substantially planar configuration before being folded, rolled up, or otherwise stowed with the airbag 4.

With reference to FIGS. 7A to 7F, the airbag assembly 300 according to the third arrangement of the present disclosure may comprise one or more resilient ramp members 308. As shown in FIGS. 7A to 7F, the airbag assembly 300 may not comprise the ramp carrier, and the ramp members 308 may be coupled directly to the SAC bag 4.

As the airbag is deployed, as depicted in FIGS. 7B to 7F, the SAC bag 4 may unroll over vehicle support pillars, 12, 14. When the SAC bag 4 has unrolled to the point at which the ramp member 308 becomes unrolled from the airbag, the resilient ramp member 308 may return to the undeformed position, as shown in FIG. 7C. In the undeformed position the resilient ramp member 308 may have a different shape with an increased thickness compared to in the planar, stowed configuration.

The position at which the ramp member 308 is coupled to the airbag 4 and/or the thickness of the resilient ramp member in the undeformed position may be configured such that the SAC bag 4 is lifted away from the pillar 12, 14 at or near a component, such as D-loop adjusters 26, 28, due to the presence of the ramp. The SAC bag 4 may, therefore, be assisted in riding over the component by the ramp member 308, such that the speed of the deployment of the airbag is substantially unaffected by the presence of the component.

Once the airbag has passed over the component and unrolled further, the ramp member 308 may be positioned away from the pillar 12, 14. This may allow further deployment of the airbag to be substantially unaffected by the presence of the ramp member 308.

As depicted in FIGS. 7C to 7F, in the undeformed configurations, e.g., the ramped configuration, the resilient ramp members 308 may be substantially triangular, e.g., wedge shaped, when viewed from the rear of the vehicle as shown. The dimensions of the triangle, such as the height of the peak of the triangle from the wall of the airbag, the width of the base of the triangle where it couples to the airbag and the angles of the sides of the triangle may be configured to allow the SAC bag 4 to be lifted off the pillar 12, 14 by the ramp member 308 and to pass over the component with the least disturbance to the deployment of the airbag.

Figure 8:
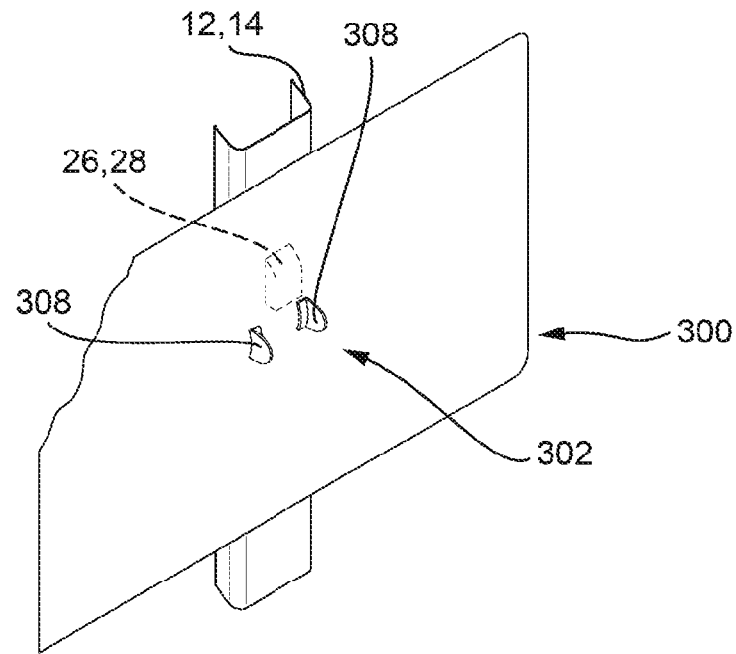
FIG. 8 is a perspective view of the SAC bag comprising the deployable ramp, according to the third arrangement of the present disclosure, in a deployed condition.

With reference to FIG. 8, a plurality of resilient ramp members 308 may be spaced laterally across the airbag. For example, as depicted in FIG. 8, the ramp portion 304 may comprise two resilient ramp members spaced on either side of the component. Further, resilient ramp members may be spaced similarly on either side of any other components, e.g., provided on other pillars 12, 14 of the vehicle. Spacing the resilient ramp members either side of the component may reduce the likelihood of interference between the resilient ramp members 308 and the components. However, it is equally envisaged that one resilient ramp member 308 may be aligned with each of the one or more components 26, 28, which the airbag may ride over during deployment.

As shown in FIG. 8, the protruding portion 308b of the ramp member 308, may be provided in a vertical plane. However, in other arrangements, the protruding portion 308b may be provided in a horizontal plane. If the protruding portion is provided in a horizontal plane, each resilient ramp member 308 may extend laterally across the airbag, and may extend, approximately, across the width of one or more components. The lateral width of the ramp members 308 may, therefore, be dependent on the width of the components. Alternatively, the resilient ramp member 308 may extend across areas of the airbag aligned with two or more of the components. For example, the resilient ramp member may extend from in front of the B-pillar 12 to behind the C-pillar 14. Alternatively, the resilient ramp member may extend substantially across the length of the airbag 4 from the front of the vehicle to the rear.

Figure 9:
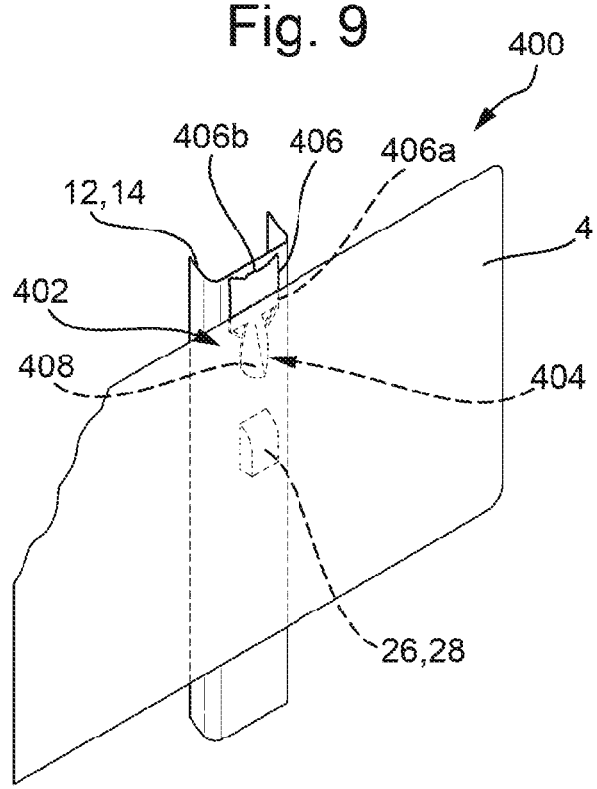
FIG. 9 is a perspective view of a SAC bag comprising a deployable ramp, according to a fourth arrangement of the present disclosure, in a deployed condition.

With reference to FIGS. 9 to 14, an airbag assembly 400, according to a fourth arrangement of the present disclosure will now be described. As shown in FIG. 9, a resilient ramp member 408 may be coupled to a ramp carrier 406 at a first end 406a of the ramp carrier. A second end 406b of the ramp carrier 406 may be coupled to the vehicle 2, e.g., at the pillar 12, 14 or roof rail 8. Additionally or alternatively, the ramp carrier 406 may be coupled to the airbag 4. When the SAC bag 4 is in a stowed configuration, the ramp carrier 406 may be rolled up with the airbag, as shown in FIG. 14A.

The length of the ramp carrier 406 may be configured such that when the deployable ramp 402 is deployed, the resilient ramp member 408 is positioned appropriately relative to the component to assist the SAC bag 4 in riding over the component during deployment of the airbag (as shown in FIGS. 14A to 14F).

Figure 13:
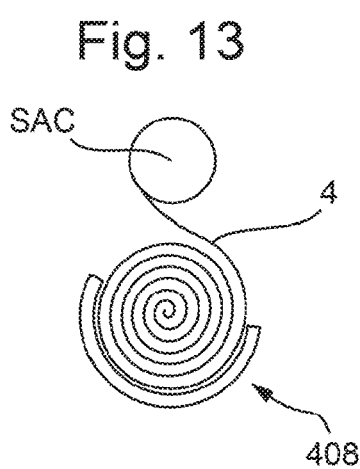
FIG. 13 shows a rear view of the deployable ramp and the SAC bag, according to the fourth arrangement of the present disclosure, in a stowed configuration.
Figure 14A:
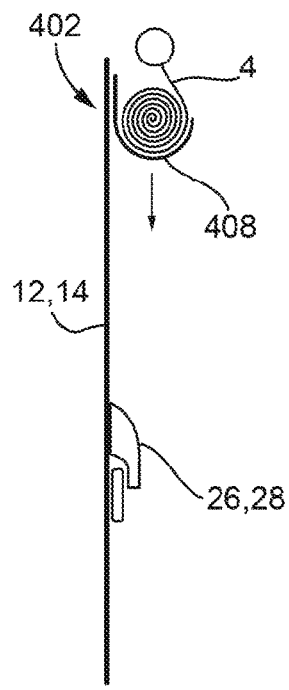
FIGS. 14A to 14F show sectional rear views of the vehicle pillar and the D-loop height adjuster, and the SAC bag comprising the deployable ramp, according to the fourth arrangement of the present disclosure, in progressive stages of deployment.
Figure 14B:
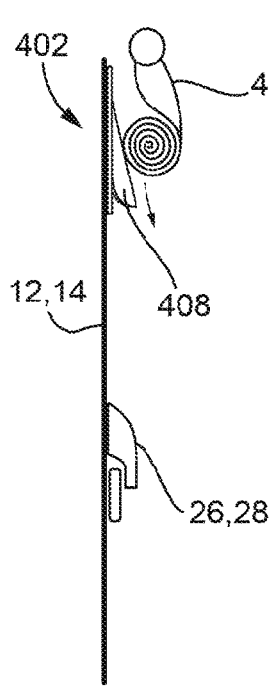
Figure 14C:
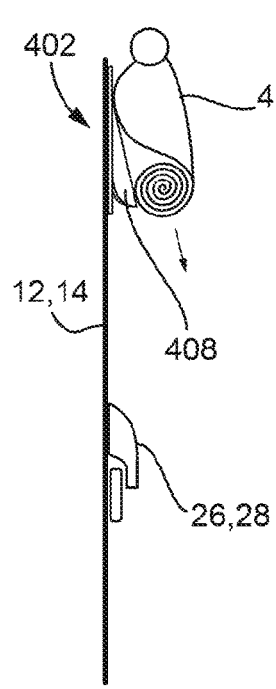
Figure 14D:
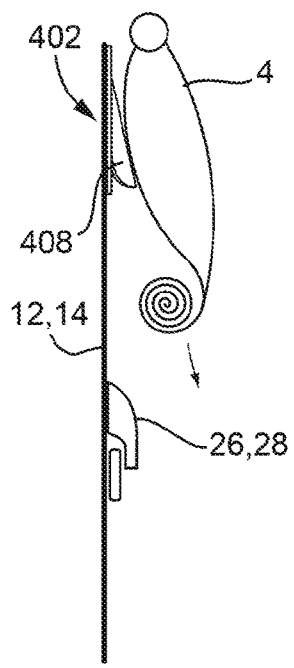
Figure 14E:
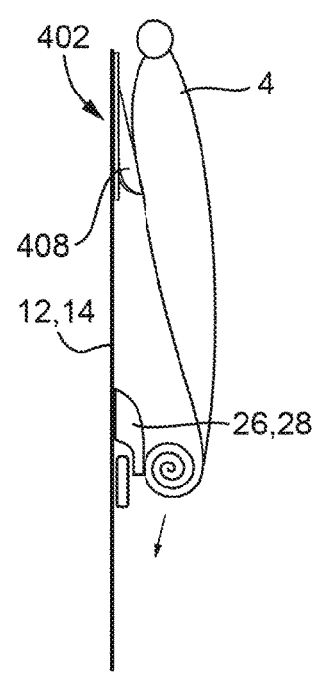
Figure 14F:
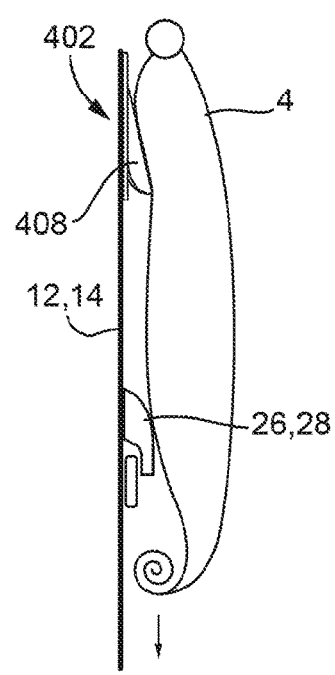

In another arrangement, as shown in FIG. 13, the resilient ramp member 408 may be coupled directly to the airbag 4. As depicted, the resilient ramp member 408 may be coupled towards the top of the SAC bag 4. Alternatively, the resilient ramp member 408 may be coupled to the SAC bag 4 at a location further down the SAC bag 4, e.g. such that when the SAC bag 4 is deployed, the resilient ramp member 408 is positioned appropriately relative to the component.

With reference to FIGS. 10A to 10D, the resilient ramp member 408 may comprise an attachment portion 408a, configured to couple to the ramp carrier 406; a body portion 408b, configured to form a ramped shape when the resilient ramp member 408 is in the undeformed, e.g., ramped configuration; and one or more tethers 412 configured to encourage the resilient ramp member 408 to transition from a substantially flat configuration prior to deployment into a ramped configuration following deployment of the airbag, as described in greater detail below.

The body portion 408b may be integrally formed with the attachment portion 408a. Alternatively, the body portion 408b may be coupled to the attachment portion, e.g., with the flexible coupling. The body portion 408b may be coupled to the attachment portion 408a over part of the width of the attachment portion 408a.

The attachment portion 408a may be substantially flat. As depicted in FIG. 10B, the attachment portion 408 may be substantially rectangular and may extend laterally to provide a suitable area to allow the resilient ramp member 408 to be coupled to the ramp carrier 406, for example by stitching or bonding the attachment portion 408a to the ramp carrier 406. It will be appreciated that the attachment portion 408a may be any shape or size desirable depending on the method used to couple the resilient ramp member 408 to the ramp carrier 406.

The body portion 408b may be curved or bent to form an arch 414, as depicted in FIG. 10C. An apex of the arch 414 may extend from the attachment portion 408a along the length of the body portion. As shown in FIG. 10, the arch 414 may be substantially U or V-shaped. The arch formed in the body portion 408b may increase in size further from the attachment portion 408a, such that the body portion forms a ramp, which ramps upwards in a direction away from the attachment portion 408a, e.g., in the direction the airbag deploys. The lateral sides 408c, 408d of the body portion 408b may be profiled to define the shape and/or slope of the ramp. As shown in FIG. 10b, the lateral sides 408c, 408d of the body portion 408b may be curved. The body portion 408b may be substantially oval or tear drop shaped in a side view relative to the vehicle, as depicted in FIG. 10B. It is also equally envisaged that the lateral sides of the body portion 408b may be straight and the body portion 408b may be substantially rectangular or triangular when viewed in a side view relative to the vehicle.

The resilient ramp member 408 may be deformed, into a substantially planar configuration, in which it can be stowed with the airbag 4. The resilient ramp member may be configured to return to an undeformed, e.g., ramped, configuration following deployment of the airbag 4.

With reference to FIGS. 10A to 10C, the resilient ramp member 408 may be manufactured in the undeformed, ramped condition depicted. The tethers 412 may be coupled at a first end 412a of the tethers to the attachment portion 408a. As shown in FIGS. 10A to 10C, there may be two tethers 412, which are coupled at the ends of the attachment portion, e.g. either side of the body portion 408b. The tethers 412 may be coupled to the attachment portion 408a at positions that are spaced apart from the connection between the attachment portion 408a and the body portion 408b.

Figure 11A:
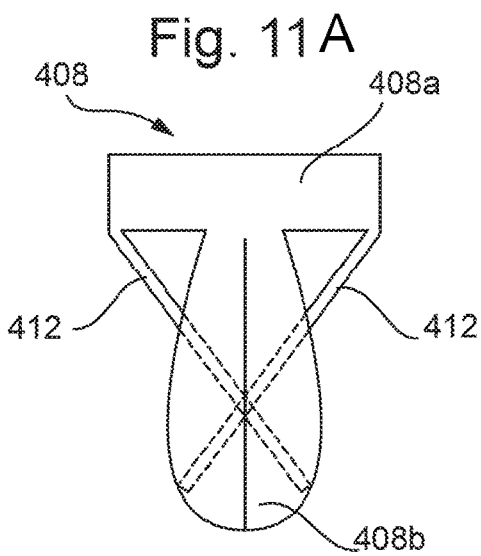
FIGS. 11A and 11B, show side and bottom views respectively of the resilient ramp member for the deployable ramp, according to the fourth arrangement of the present disclosure, in a ramped configuration.
Figure 11B:
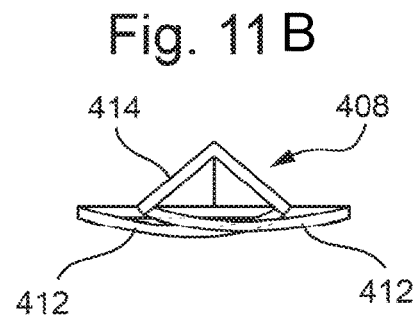
Figure 12A:
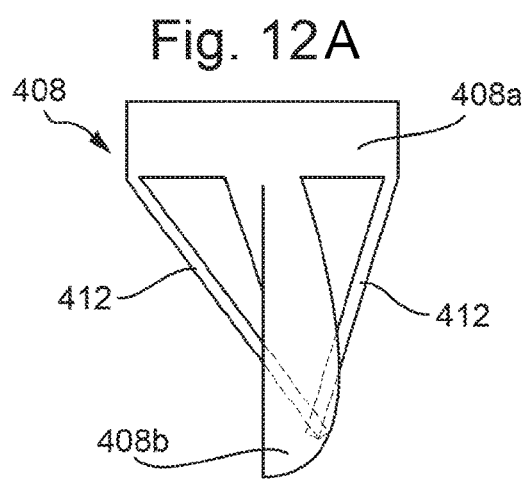
FIGS. 12A, 12B and 12C, show side, rear and bottom views respectively of the resilient ramp member for the deployable ramp, according to the fourth arrangement of the present disclosure, in a folded configuration.
Figure 12B:
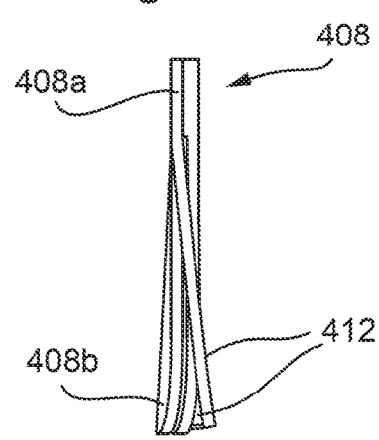
Figure 12C:
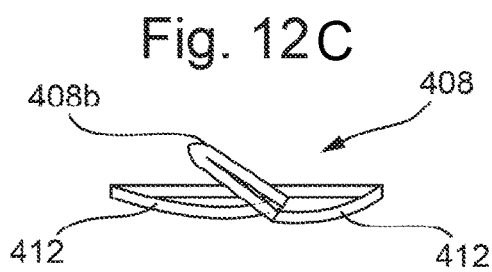

To prepare the resilient ramp member to be stowed with the airbag, as depicted in FIGS. 11A and 11B, the tethers 412 may be crossed over each other, beneath the body portion 408b and coupled to the opposite side of the body portion 408b at second ends 412b of the tethers, respectively. The second end of the tethers 412b may be coupled to the body portion towards an end of the body portion 408b, which is away from the attachment portion 408a. When deforming the resilient ramp member 408 into the planar configuration to be stowed, as shown in FIG. 12A to 12C, the arch formed in the body portion 408b may be closed and folded over to create a pleat or tuck in the resilient ramp member 408. Closing and folding the arch of the body portion 408b in this way may tighten and/or stretch the tethers 412.

The resilient ramp member 408 and the tethers 412 may be made from a resilient material, e.g. a plastic such as nylon. Hence, when the resilient ramp member 408 is in the stowed configuration, the resilient ramp member 408 may be biased to return to the undeformed ramped condition due to the resilient nature of the material.

As depicted in FIG. 13, the deployable ramp may be wrapped or rolled around the SAC bag 4 or otherwise stowed together with the airbag 4 within the airbag cavity 30 of the vehicle.

With reference to FIGS. 14A to 14F, which show progressive stages in the deployment of the SAC bag 4, when the airbag system 400 is deployed, the resilient ramp member 408 may be allowed to unfurl from around the SAC bag 4. Due to the resilience of the ramp member 408, the pleat in the ramp member may unfold and the arch may reopen, increasing the thickness of the resilient ramp member and providing a ramped shape to encourage the SAC bag 4 to ride over the component 26, 28. As described above, the tethers 412 may have been put under tension during the deformation of the resilient ramp member and may pull on the body portion 408b of the ramp member to encourage the body portion to unfold, and the arch to re-open, returning the resilient ramp member into the undeformed configuration.

Figure 15A:
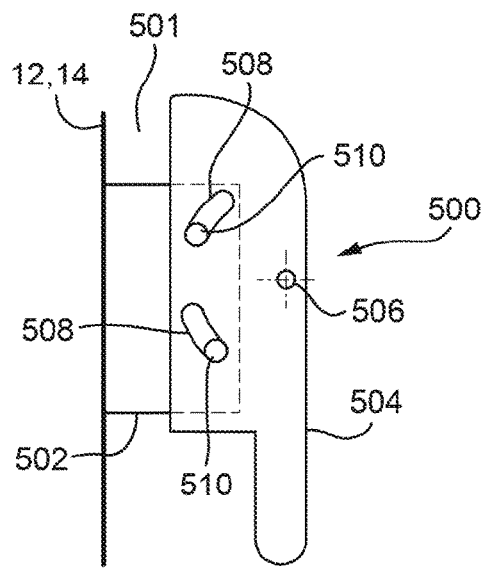
FIG. 15A is a rear view of a component of a vehicle configured to allow a SAC bag to ride over the component during deployment of the SAC bag, according to a fifth arrangement of the present disclosure, in a neutral position.
Figure 15B:
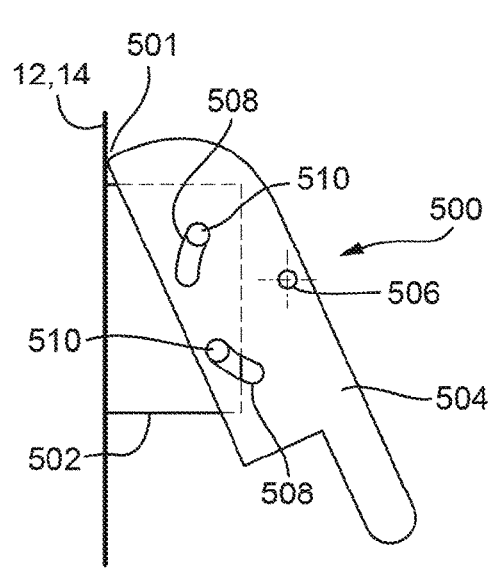
FIG. 15B is a rear view of a component of a vehicle configured to allow a SAC bag to ride over the component during deployment of the SAC bag, according to a fifth arrangement of the present disclosure, in a pivoted position.

With reference to FIGS. 15A and 15B, a component 500 of a vehicle, according to a fifth arrangement of the present disclosure, is described. The component 500 may be fixed to the interior of the vehicle in the deployment path of the airbag 4. The component 500 may be configured to encourage the airbag 4 to deploy over the component.

The component 500 may comprise a body portion 502 and movable portion 504. The body portion 502 may be configured to couple the component to the interior of the vehicle 2, for example the body portion may be configured to couple to the pillars 12, 14 of the vehicle. The body portion 502 may be movably coupled to the vehicle, e.g. slideably coupled, however, it is equally envisaged that the body portion 502 may not move relative to the vehicle 2.

The movable portion 504 may be movably coupled to the body portion 502. The movable portion 504 may comprise one or more slots 508, which may interface with corresponding followers 510 provided on the body portion 502. The arrangement of the slots 508 and followers 510 may allow the movable portion 504 to move relative to the body portion 502, as shown in FIG. 15B. The range of movement of the movable portion 504 relative to the body portion 503 may be defined by the slots 508 and followers 510.

In the arrangement shown in FIGS. 15A and 15B, the movable portion 504 is pivotally coupled to the body portion 502 and is configured to pivot about pivot point 506. The slots 508 may be curved, such that the movable portion 504 is able to rotate relative to the body portion 502. The pivot point 506 may therefore be a virtual pivot e.g. there may be not pivot pin provided on the component 500. The pivot point 506 may be spaced apart from the component 500. For example, the center of curvature of the slots 508 may be outside the component 500.

In an alternative arrangement, not shown, the slots 508 may be provided on the body portion 502 and the followers 510 may be provided on the movable portion 504.

The movable portion 504 may at least partially form an outer surface of the component 500, e.g. the surface that is adjacent to the airbag 4 when the airbag is deployed.

The component 500 may be a D-loop height adjuster, and may be provided on the vehicle 2 in place of the previously proposed D-loop height adjusters 26, 28. When the SAC bag 4 is inflated, the unrolling airbag may impact the component 500 and may cause the movable portion 504 to move, e.g. pivot, relative to the body portion 502. Movement of the movable portion 504 in this way may reduce the size of a gap 501 between the component 500 and the vehicle pillar 12, 14, which may reduce the likelihood of the deployment of the SAC bag 4 being slowed or disrupted due to the presence of the component 500. The angle of the outer surface of the component 500, provided on the movable portion 504, may change, which may encourage the SAC bag 4 to ride over the component 500.

Figure 16:
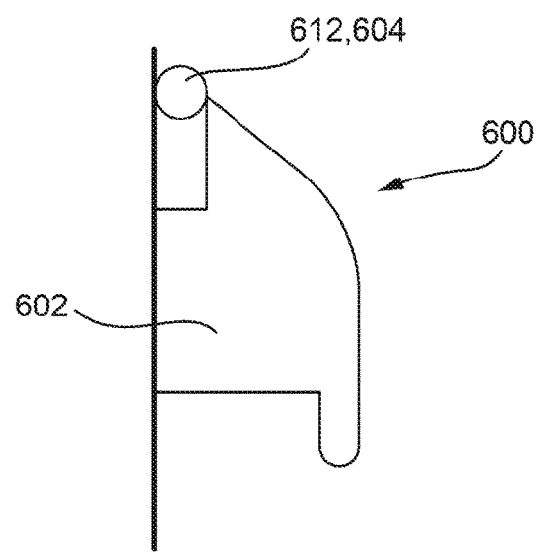
FIG. 16 is a rear view of a component of a vehicle configured to allow a SAC bag to ride over the component during deployment of the SAC bag, according to a sixth arrangement of the present disclosure.

With reference to FIG. 16, the movable portion 604 of the component 600, according to a sixth arrangement of the present disclosure may be in the form of a roller 612. The roller 612 may be movably coupled, e.g. pivotally coupled, to the body portion 602.

The roller 612 may be configured to rotate about a pivot provided on the body portion 602. However, it will be appreciated that the roller 612 may instead be a separate component (separate from a movable portion 604) and may be movably coupled to a separate movable portion 604. The movable portion 604 may be configured to move relative to the body portion 602, for example, the movable portion may be configured similarly to the movable portion 504 described above with reference to the fifth arrangement of the disclosure. The movement of the movable portion 604 may affect the location of the roller 612 relative to the body portion 602.

As described above, the component 600 may be a D-loop height adjuster, which is provided on the vehicle 2 in place of the previously proposed D-loop height adjusters 26, 28. When the SAC bag 4 is deployed and rides over the component 600, the roller 612 may pivot, which may reduce the friction between the component 600 and the airbag 4. This may reduce the disturbance caused to the deployment of the airbag 4 by the component 600, as the airbag 4 rides over the component 600.

Figure 17:
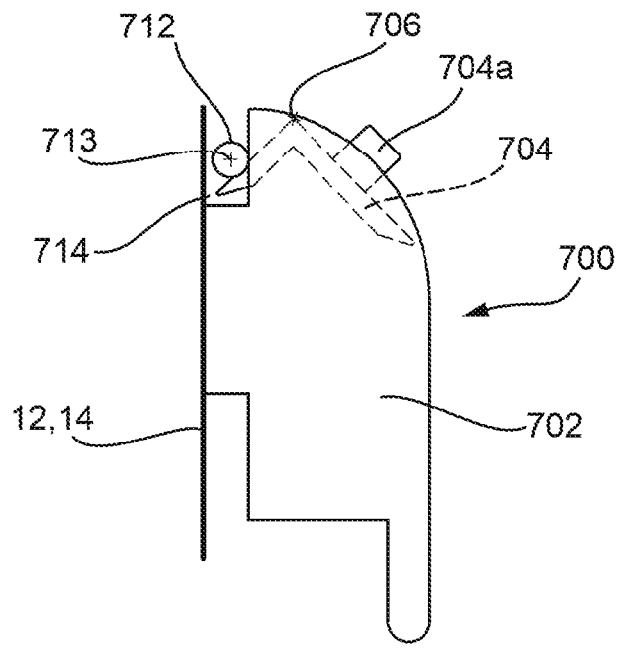
FIG. 17A is a rear view of a component of a vehicle configured to allow a SAC bag to ride over the component during deployment of the SAC bag, according to a seventh arrangement of the present disclosure, with a roller in a stowed position.
FIG. 17B is a rear view of the component of a vehicle configured to allow the SAC bag to ride over the component during deployment of the SAC bag, according to the seventh arrangement of the present disclosure, with the roller in a deployed position.
Figure 17:
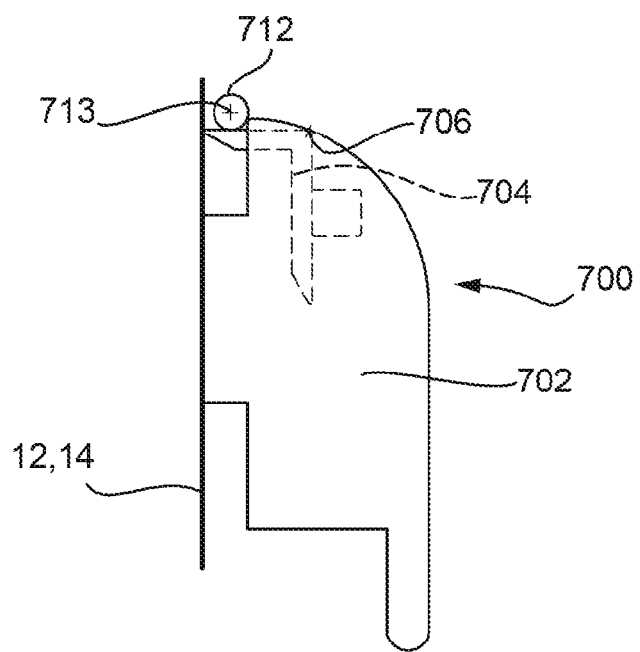

With reference to FIGS. 17A and 17B, in a seventh arrangement of the present disclosure, the movable portion may comprise a movable arm 704, which is movably, e.g. pivotally, coupled to the body portion 702 at pivot point 706. A roller 712 may be configured to pivot about a pivot point 713 provided on the movable arm 704. Before the airbag 4 is deployed, the roller 712 may be located, e.g. stowed, within a recess 714 provided in the body portion 702 of the component 700. A portion 704*a* of the movable arm may extend beyond the outer surface of the component 700, such that as the airbag 4 is deployed, the airbag 4 acts against the portion 704*a*, and the movable arm 704 is moved relative to the body portion 702. When the movable arm is moved under the action of the deploying airbag 4, the roller 712 may be moved out of the recess 714 and may be provided in a suitable position, such that the pivoting of the roller may reduce the friction between the airbag 4 and the component 700, as described with reference to the sixth arrangement above.

With reference to FIGS. 18A and 18B, a movable portion 804, according to an eighth arrangement of the present disclosure, may comprise a slider 812. The slider 812 may be movably coupled, e.g. slideably coupled, to the body portion 802. As depicted in FIGS. 18A and 18B, the slider 812 may comprise one or more followers 816 and the body portion 802 may comprise one or more slots 818. Alternatively, the followers 816 may be provided on the body portion 802, and the slots 818 may be provided on the slider 812. It will be appreciated that other features, such as a guide slot 820, may additionally or alternatively be provided on the slider 812 and/or the body portion 802 to movably couple the slider 814 to the body portion 802. As depicted in FIGS. 18A and 18B, the slider may at least partially form an outer surface of the component 800.

As described above, the component 800 may be a D-loop height adjuster, and may be provided on the vehicle 2 in place of the previously proposed D-loop height adjusters 26, 28. When the SAC bag 4 is deployed, the unrolling airbag may impact the component 800 and may cause the slider 812 to move, e.g. slide, relative to the movable portion 804. Movement of the slider 812 in this way may reduce the size of the gap 801 between the component 800 and the vehicle pillar 12, 14, which may reduce the likelihood of the deployment of the SAC bag 4 being slowed or disrupted due to the presence of the component 800. The slider 812 may form a ramp that may encourage the SAC bag 4 to ride over the component 800.

It will be appreciated by those skilled in the art that although the disclosure has been described by way of example, with reference to one or more examples, it is not limited to the disclosed examples and alternative examples may be constructed without departing from the scope of the invention as defined by the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle airbag assembly comprising:
   an airbag;
   a ramp carrier; and
   a deployable ramp provided on the carrier to unfurl during airbag deployment and ride over a vehicle component and including a movable element to move from a first position in a stowed configuration to a second position in a ramped configuration responsive to the deployment,
   wherein a ramp thickness increases along an airbag length when the movable element is in the second position.

2. The airbag assembly according to claim 1 further comprising a tether coupled at a first end to the movable element and at a second end to a location on the deployable ramp spaced apart from the moveable element such that during the deployment, the tether moves the movable element from the first position to the second position.

3. The airbag assembly according to claim 1, wherein the deployable ramp comprises one or more ramp members configured to change orientation during deployment such that the change in orientation of the ramp members increases the thickness of the deployable ramp.

4. The airbag assembly according to claim 3, wherein the orientation comprises two or more ramp members that forms a wedge during deployment.

5. The airbag assembly according to claim 3 further comprising one or more tethers coupled to one or more of the ramp members, wherein the tethers become tight during the deployment and urge the orientation of the ramp members to change.

6. The airbag assembly according to claim 3, wherein the ramp members are provided within a pocket formed on the deployable ramp.

7. The airbag assembly according to claim 3, wherein the ramp members are deformed into a substantially planar configuration before the deployment and return to a substantially undeformed configuration after the deployment, increasing the thickness of the deployable ramp.

8. The airbag assembly according to claim 3, wherein the ramp members are profiled such that the thickness of the deployable ramp varies over a span of the ramp members in a direction of the deployment.

9. A vehicle seat belt assembly comprising:
a height adjuster located on an interior surface of a cabin and in a deployment path of an airbag body;
a ramp carrier mounted adjacent the height adjuster; and
a deployable ramp mounted to the ramp carrier and including a movable portion to move relative to the airbag body such that the movable portion guides the airbag body during a deployment of the airbag body over the height adjuster and such that a ramp thickness increases along an airbag length when the movable portion transitions from a first position to a second position.

10. The vehicle seat belt assembly according to claim 9, wherein the movable portion is configured such that the airbag imparts a load on to the movable portion during deployment of the airbag, causing the movable portion to move relative to the airbag body.

11. The vehicle seat belt assembly according to claim 9, wherein the movable portion at least partially forms an outer surface of the height adjuster.

12. The vehicle seat belt assembly according to claim 9, wherein one of the airbag body and the movable portion comprise one or more slots, and the other of the airbag body and the movable portion comprise one or more followers configured to slide in respective slots, such that the movable portion moves relative to the airbag body.

13. The vehicle seat belt assembly according to claim 12, wherein the one or more slots are curved such that the movable portion is rotatable with respect to the airbag body.

14. The vehicle seat belt assembly according to claim 9 further comprising a pivot configured to allow the moveable portion to turn to encourage the deployment of the airbag body over the height adjuster.

15. The vehicle seat belt assembly according to claim 14 further comprising a roller configured to rotate as the airbag rides over the height adjuster about the pivot provided on the airbag body.

16. The vehicle seat belt assembly according to claim 9 further comprising a movable arm configured to alter a position of the roller relative to the airbag body such that the roller rotates about a further pivot provided on the movable arm.

17. The vehicle seat belt assembly according to claim 16, wherein the movable arm is configured to move the roller out of a recess in the airbag body.

18. The vehicle seat belt assembly according to claim 16, wherein a portion of the movable arm extends beyond an outer surface of the height adjuster and is configured to move the movable arm during the deployment of the airbag.

19. A vehicle comprising:
a seat belt assembly including a height adjuster configured for placement on an interior surface of a cabin; and
an airbag assembly including a ramp carrier having an airbag body and a deployable ramp to transition between a first stowed configuration to a ramped configuration, the airbag assembly defining a deployment path intersecting the height adjuster,
wherein the deployable ramp includes a movable element configured to, in response to the deployment, move from the first stowed configuration to the ramped configuration to guide the airbag body over the height adjuster, the movable element being arranged such that, when in the second ramped configuration, a thickness of the deployable ramp increases along a length of the airbag body.

* * * * *